(12) United States Patent
Shibano (10) Patent No.: US 11,735,052 B2
(45) Date of Patent: Aug. 22, 2023

(54) METHOD, INFORMATION PROCESSING DEVICE, AND PROGRAM

(71) Applicant: TOYOTA JIDOSHA KABUSHIKI KAISHA, Aichi-ken (JP)

(72) Inventor: Takumi Shibano, Nagoya (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 177 days.

(21) Appl. No.: 17/511,560

(22) Filed: Oct. 27, 2021

(65) Prior Publication Data
US 2022/0180752 A1 Jun. 9, 2022

(30) Foreign Application Priority Data
Dec. 3, 2020 (JP) .................. 2020-201335

(51) Int. Cl.
*B60W 20/10* (2016.01)
*G08G 1/00* (2006.01)

(52) U.S. Cl.
CPC .............. *G08G 1/202* (2013.01); *B60W 20/10* (2013.01); *G08G 1/205* (2013.01)

(58) Field of Classification Search
CPC ........ G08G 1/202; G08G 1/205; B60W 20/10
See application file for complete search history.

(56) References Cited

FOREIGN PATENT DOCUMENTS

JP 2016164758 A 9/2016

*Primary Examiner* — Mathew Franklin Gordon
(74) *Attorney, Agent, or Firm* — Hauptman Ham, LLP (57) ABSTRACT

A method executed by an information processing device, the method including: acquiring a first predicted value of a power demand in an area that includes one or more residential facilities; and dispatching a vehicle that moves at least some of the residents of the area from the residential facilities when a predetermined condition relating to the first predicted value is satisfied.

20 Claims, 4 Drawing Sheets

METHOD, INFORMATION PROCESSING DEVICE, AND PROGRAM

CROSS-REFERENCE TO RELATED APPLICATION

This application claims priority to Japanese Patent Application No. 2020-201335 filed on Dec. 3, 2020, incorporated herein by reference in its entirety.

BACKGROUND

1. Technical Field

The present disclosure relates to a method, an information processing device, and a program.

2. Description of Related Art

Conventionally, a technique for reducing power demand is known. For example, Japanese Unexamined Patent Application Publication No. 2016-164758 (JP 2016-164758 A) discloses a system used for an effort to encourage a resident of a house in a certain area to go outside and reduce energy consumption in the area.

SUMMARY

It is desired to improve the technology related to the reduction of power demand.

The purpose of the present disclosure made in view of such circumstances is to improve the technology for reducing the power demand.

A method according to one embodiment of the present disclosure is a method executed by an information processing device and includes acquiring a first predicted value of power demand in an area that includes one or more residential facilities; and dispatching a vehicle that moves at least some of the residents of the area from the residential facilities when a predetermined condition relating to the first predicted value is satisfied.

An information processing device according to an embodiment of the present disclosure is an information processing device comprising a control unit, in which the control unit: acquires a first predicted value of power demand in an area that includes one or more residential facilities; and dispatches a vehicle that moves at least some of the residents of the area from the residential facilities when a predetermined condition relating to the first predicted value is satisfied.

A program according to one embodiment of the present disclosure causes an information processing device to execute acquiring a first predicted value of power demand in an area that includes one or more residential facilities; and dispatching a vehicle that moves at least some of the residents of the area from the residential facilities when a predetermined condition relating to the first predicted value is satisfied.

According to one embodiment of the present disclosure, a technique for reducing power demand is improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the present disclosure will be described.

Outline of Embodiment

Figure 1:
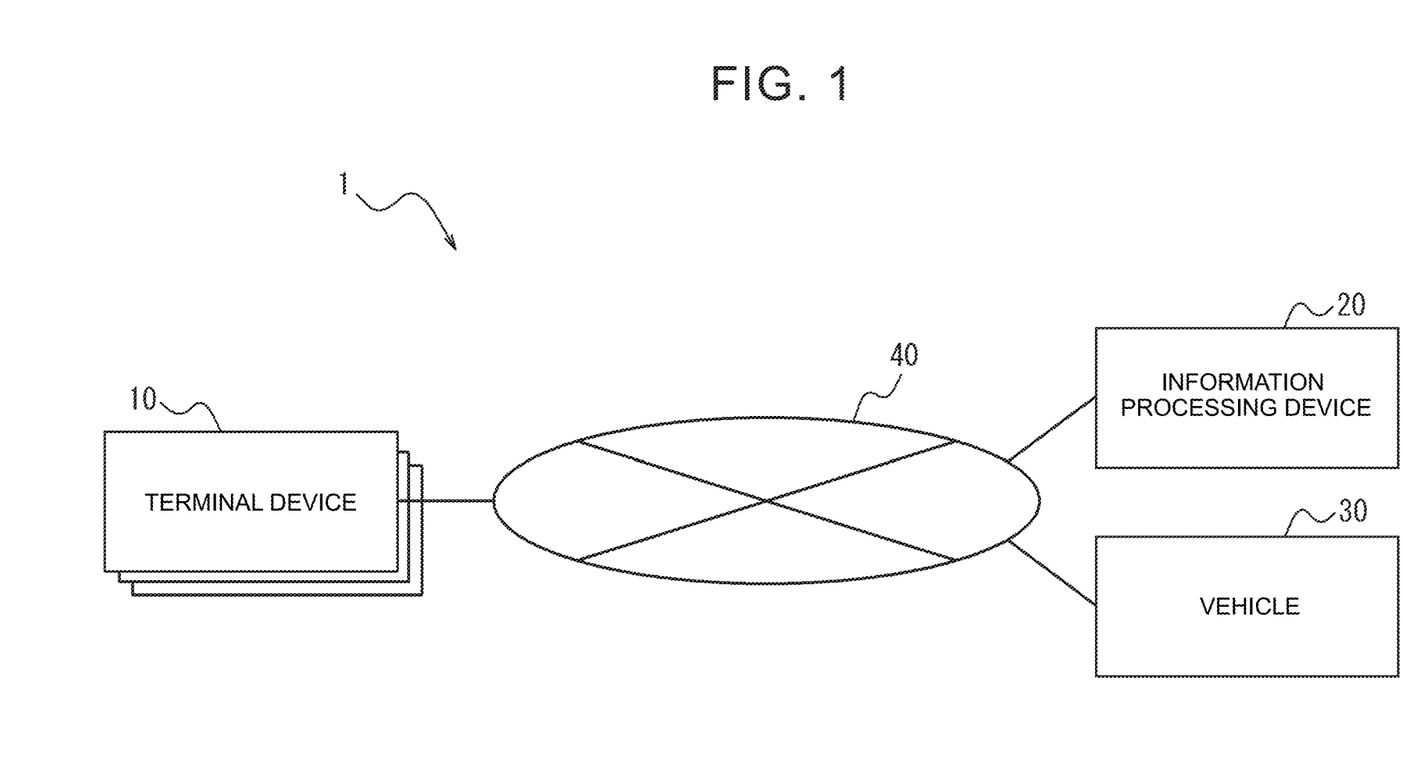
FIG. 1 is a block diagram showing a schematic configuration of a system according to an embodiment of the present disclosure.

The outline of a system 1 according to one embodiment of the present disclosure will be described with reference to FIG. 1. The system 1 includes one or more terminal devices 10, an information processing device 20, and a vehicle 30. The terminal device 10, the information processing device 20, and the vehicle 30 are connected to a network 40 including a mobile communication network and the Internet, for example, so as to be able to communicate with each other.

The terminal device 10 is an arbitrary device used by residents of an area who live in a residential facility existing in the area. For example, a smartphone, a tablet terminal, a personal computer (PC), a home energy management system (HEMS) dedicated terminal, or the like can be adopted as the terminal device 10. The residential facility is a single-family house or multiple dwelling house such as an apartment house, a condominium, or a house for the elderly, etc., but the residential facility is not limited to these, and may be any facility in which a person lives.

The information processing device 20 is, for example, a server device, but the information processing device 20 is not limited to this, and may be any computer. The vehicle 30 is, for example, a passenger vehicle such as a bus, but is not limited to this, and may be any vehicle on which a human can ride. The vehicle 30 may be capable of automatic driving at levels such levels 1 to 5 defined in, Society of Automotive Engineers (SAE) for example.

The vehicle 30 is used to move at least some of the residents of an area including one or more housing facilities from the housing facilities (that is, make the residents get out of the area). As a result of the residents going out, the power demand in the residential facility can be reduced, and as a result, the power demand in the entire area can be reduced.

First, the outline of the present embodiment will be described, and the details will be described later. The information processing device 20 acquires a first predicted value of the power demand in the area including one or more residential facilities. Then, when a predetermined condition regarding the first predicted value is satisfied, the information processing device 20 dispatches the vehicle 30 that moves at least some of the residents in the area from the residential facility.

As described above, according to the present embodiment, the vehicle 30 is dispatched when the predetermined condition regarding the first predicted value of the power demand of the target area is satisfied. For example, the vehicle 30 can be dispatched when the power demand in the area is expected to be relatively large, such as when the first predicted value is equal to or higher than a predetermined threshold value. By dispatching the vehicle 30, it is possible to motivate at least some of the residents in the area to move (that is, go out) from the residential facility. As mentioned above, as a result of the residents going out, the power demand in residential facilities can be reduced. Thus, as a result of reducing the power demand in the residential facility, the technology for reducing the power demand is improved in that the probability that the power demand in the entire area is reduced is improved.

Next, configurations in the system 1 will be described in detail.

Configuration of Terminal Device

Figure 2:
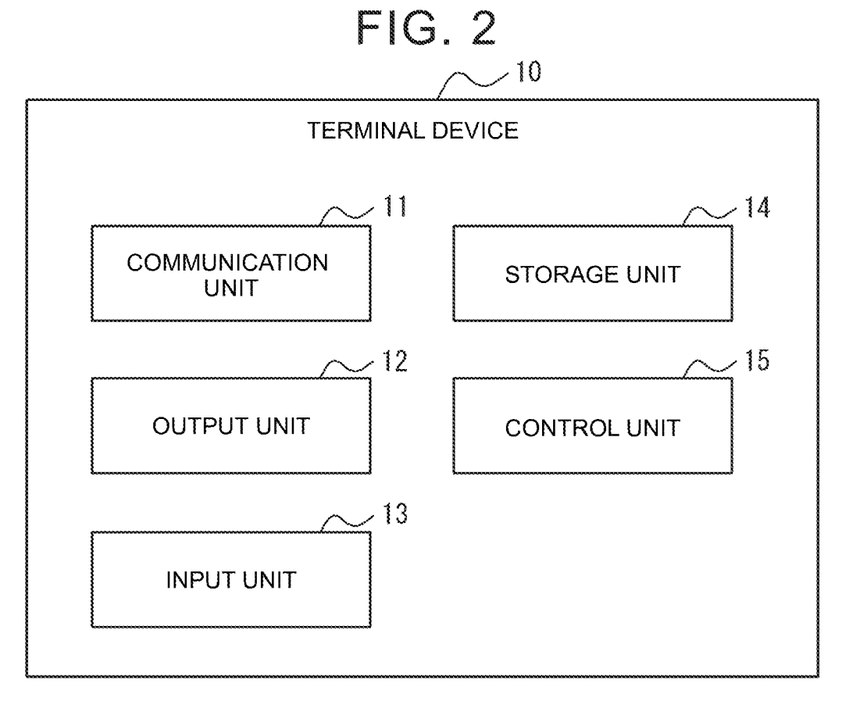
FIG. 2 is a block diagram showing a schematic configuration of a terminal device.

As shown in FIG. 2, the terminal device 10 includes a communication unit 11, an output unit 12, an input unit 13, a storage unit 14, and a control unit 15.

The communication unit 11 includes one or more communication interfaces connected to the network 40. The communication interface supports, for example, 4th generation (4G) and 5th generation (5G) mobile communication standards. The supported standards are not limited to these, and the communication interface may support any mobile communication standards. In the present embodiment, the terminal device 10 communicates with the information processing device 20 via the communication unit 11 and the network 40.

The output unit 12 includes one or more output device that output information to notify the user. For example, the output device is, but is not limited to, a display that outputs information as images, a speaker that outputs information as audio, and the like.

The input unit 13 includes one or more input devices that detect user input. The input device is, for example, a physical key, a capacitance key, a touch screen provided integrally with the display of the output unit 12, a microphone for receiving voice input, a camera, and the like, but is not limited thereto.

The storage unit 14 includes one or more memories. In the present embodiment, the memories are, for example, a semiconductor memory, a magnetic memory, or an optical memory, but are not limited to these memories. Each memory included in the storage unit 14 may function as, for example, a main storage device, an auxiliary storage device, or a cache memory. The storage unit 14 stores any information used for the operation of the terminal device 10. For example, the storage unit 14 may store, a system program, an application program, or the like. The information stored in the storage unit 14 may be updatable with information received from the network 40 via the communication unit 11, for example.

The control unit 15 includes one or more processors, one or more programmable circuits, one or more dedicated circuits, or a combination of these. The processors are, for example, a general-purpose processor such as a central processing unit (CPU) or a graphics processing unit (GPU), or a dedicated processor specialized for a specific process, but are not limited to these processors. The programmable circuits are, for example, a field-programmable gate array (FPGA), but are not limited to the circuit. The dedicated circuits are, for example, an application specific integrated circuit (ASIC), but are not limited to the circuit. The control unit 15 controls the operation of the terminal device 10 as a whole.

Configuration of Information Processing Device

Figure 3:
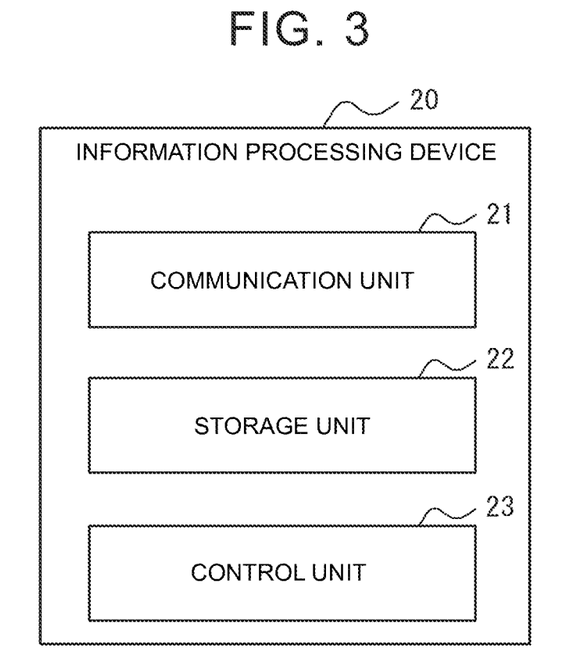
FIG. 3 is a block diagram showing a schematic configuration of an information processing device.

As shown in FIG. 3, the information processing device 20 includes a communication unit 21, a storage unit 22, and a control unit 23.

The communication unit 21 includes one or more communication interfaces connected to the network 40. The communication interfaces support, for example, a mobile communication standard, a wired local area network (LAN) standard, or a wireless LAN standard, but the supported standards are not limited to these, and the communication interfaces may support any communication standard. In the present embodiment, the information processing device 20 communicates with the terminal device 10 and the vehicle 30 via the communication unit 21 and the network 40.

The storage unit 22 includes one or more memories. Each memory included in the storage unit 22 may function as, for example, a main storage device, an auxiliary storage device, or a cache memory. The storage unit 22 stores any information used for the operation of the information processing device 20. For example, the storage unit 22 may store a system program, an application program, a database, and map information. The information stored in the storage unit 22 may be updatable with information received from the network 40 via the communication unit 21, for example.

In the present embodiment, the storage unit 22 stores the resident information of a target area. Resident information includes, for example, information indicating whether the resident is a healthy person, location information of a residential facility, and information indicating a type of energy that the resident has contracted to use in the residential facility (for example, depleting energy or renewable energy, and the like). However, the information is not limited to these, and any information about the resident may be included. The resident information may be input to the information processing device 20 via the terminal device 10 operated by the resident themselves, or may be input by the operator with the consent of the resident.

The control unit 23 includes one or more processors, one or more programmable circuits, one or more dedicated circuits, or a combination of these. The control unit 23 controls the operation of the information processing device 20 as a whole.

Configuration of Vehicle

Figure 4:
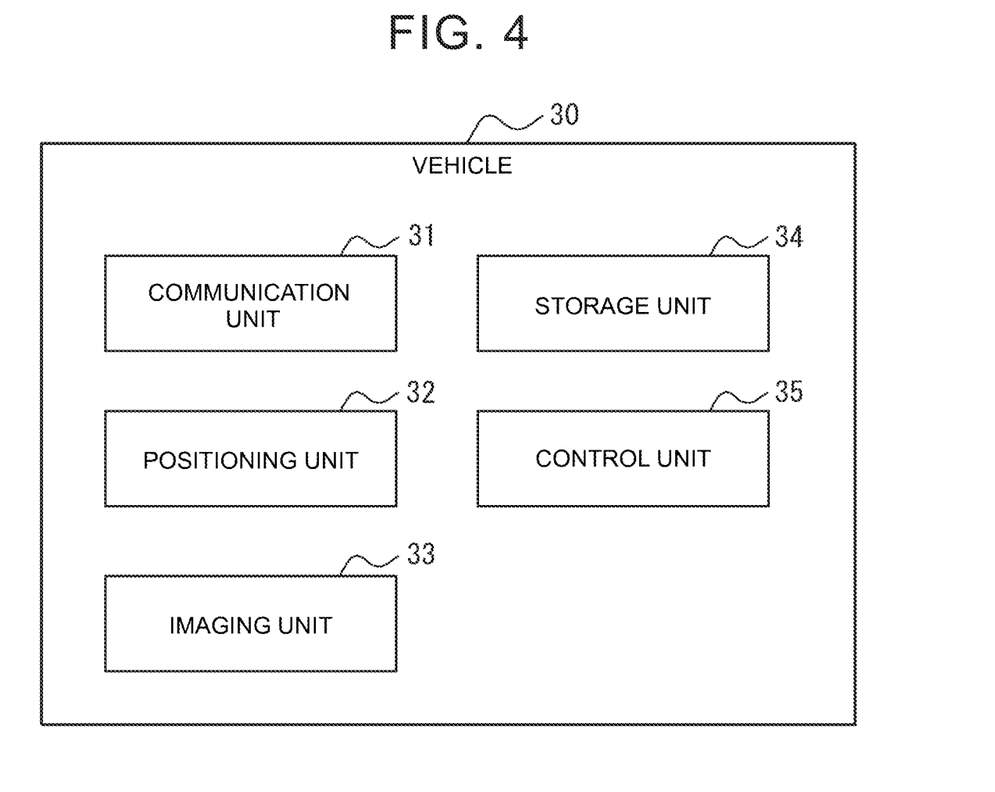
FIG. 4 is a block diagram showing a schematic configuration of a vehicle.

As shown in FIG. 4, the vehicle 30 includes a communication unit 31, a positioning unit 32, an imaging unit 33, a storage unit 34, and a control unit 35.

The communication unit 31 includes one or more communication interfaces connected to the network 40. The communication interface corresponds to, for example, mobile communication standards, but is not limited thereto. In the present embodiment, the vehicle 30 communicates with the information processing device 20 via the communication unit 31 and the network 40.

The positioning unit 32 includes one or more devices for acquiring the position information of the vehicle 30. Specifically, the positioning unit 32 includes, for example, a receiver corresponding to GPS, but is not limited to this, and may include a receiver corresponding to any satellite positioning system.

The imaging unit 33 includes one or more cameras. Each camera included in the imaging unit 33 may be provided in the vehicle 30 so as to be able to take an image of a subject outside or inside the vehicle, for example. The image generated by the imaging unit 33 can be used, for example, for automatic driving control of the vehicle 30.

The storage unit 34 includes one or more memories. Each memory included in the storage unit 34 may function as, for example, a main storage device, an auxiliary storage device, or a cache memory. The storage unit 34 stores any information used for operation of the vehicle 30. For example, the storage unit 34 may store a system program, an application program, and embedded software. The information stored in the storage unit 34 may be updatable with information received from the network 40 via the communication unit 31, for example.

The control unit 35 includes one or more processors, one or more programmable circuits, one or more dedicated circuits, or a combination of these. The control unit 35 controls the operation of the entire vehicle 30.

Operation Flow of Information Processing Device

The operation flow of the information processing device 20 will be described with reference to FIG. 5. As a general rule, the operation is an operation of dispatching the vehicle 30 when a first condition and a second condition included in the predetermined condition regarding the first predicted value of the power demand are satisfied.

Step S100: The control unit 23 of the information processing device 20 acquires the first predicted value of the power demand in the area including one or more residential facilities.

The first predicted value is, for example, a predicted value of the power demand in the area at a future time point when a predetermined time has passed from the current time. Any method can be adopted for acquiring the first predicted value. For example, the control unit 23 may calculate the first predicted value based on an actual value of the power demand received from a device such as a smart meter or an external server via the communication unit 21 and the network 40, or the control unit 23 may directly receive the first predicted value from the device.

Step S101: The control unit 23 determines whether the first condition that the first predicted value in step S100 is equal to or greater than the threshold value is satisfied. When it is determined that the first condition is satisfied (that is, the first predicted value is equal to or greater than the threshold value) (YES in step S101), the process proceeds to step S102. In contrast, if it is determined that the first condition is not satisfied (that is, the first predicted value is less than the threshold value) (NO in step S101), the process repeats step S101.

The threshold value in step S101 may be arbitrarily set. For example, the control unit 23 may determine the threshold value based on a demand response signal received from an external server managed by a business operator such as an electric power company or an aggregator via the communication unit 21 and the network 40. Alternatively, the control unit 23 may determine the threshold value based on, for example, the input of the operator.

Step S102: When it is determined in step S101 that the first condition is satisfied (YES in step S101), the control unit 23 identifies at least some of the residents of the area. Further, the control unit 23 determines a traveling route of the vehicle 30 based on the position of the specified residential facility of the resident.

As will be described later, in the present embodiment, the vehicle 30 functions as an on-demand bus that moves to a predetermined non-residential facility via the residential facility of each resident specified in step S102. Each resident identified by the information processing device 20 can move from the residential facility to a predetermined non-residential facility by the vehicle 30 by getting on the vehicle 30 that has arrived at their own residential facility. The predetermined non-residential facility is, for example, a facility such as a shopping mall, a department store, or a library, but the facility is not limited to these and may be any facility capable of accommodating a plurality of people.

Any method can be adopted to acquire information related to identifying the resident. For example, the control unit 23 may identify the residents of the area who use the depleting energy in the residential facility. Specifically, the storage unit 22 may store beforehand, information indicating whether the energy used in each residential facility in the area (for example, the energy that the resident has contracted to use in the residential facility) is depleting energy, as the resident information. Alternatively, the control unit 23 may receive the information from an external server managed by a business operator such as an electric power company or an aggregator via the communication unit 21 and the network 40. The control unit 23 may identify the resident who is using the depleting energy in the residential facility based on the information. According to such a configuration, the resident who is using the depleting energy can be motivated to go out, and the consumption of the depleting energy can be reduced in the entire area.

Alternatively, the control unit 23 may determine the cost of each resident going outside based on the resident information of the area, and identify the resident whose cost of going outside is equal to or higher than the threshold value. The cost of going outside is the cost for the resident to move (that is, go out) from the housing facility. In other words, the cost of going outside is an index showing the magnitude of the burden when the resident goes outside. The higher the cost of going outside, the greater the burden on the resident when going outside. Specifically, the control unit 23 may determine the cost of going outside for each resident so that the cost of going outside of a handicapped resident is higher than the cost of going outside of a non-handicapped resident. Alternatively, the control unit 23 may determine the cost of going outside of each resident so that the longer the distance from the residential facility to the predetermined non-residential facility, which is the destination of the vehicle 30 functioning as the on-demand bus as described above is for the resident, the higher the cost of going out. Alternatively, the control unit 23 may determine the cost of going outside of each resident so that the higher a monetary cost of the resident when moving from the residential facility to the non-residential facility without using the vehicle 30 (for example, a fare when moving from the residential facility to a predetermined non-residential facility by taxi), the higher the cost of going outside. According to such a configuration, it is possible to motivate residents who have a relatively high cost of going outside (that is, residents who have a relatively heavy burden when going out) to go out, and the probability that the power demand of the entire area will be reduced is improved.

When at least some of the residents of the area is identified, the control unit 23 determines the travel route of the vehicle 30 so that the vehicle 30 moves to a predetermined non-residential facility by way of the residential facilities of each resident that is identified. Specifically, the control unit 23 may perform a route search process with a point at which the vehicle 30 is waiting set as a starting point, the residential facility of each identified resident set as a transit point, and the predetermined non-residential facility set as a destination, so as to determine the travel route of the vehicle 30. However, determining method of the travel route is not limited to the above method, and may be determined by any method.

Step S103: The control unit 23 acquires the second predicted value of the power demand in the area.

The second predicted value is, for example, a predicted value of the power demand in the area at a future time point in which a predetermined time has elapsed from the current time for a case in which the vehicle 30 is assumed to be dispatched. Thus, while the first predicted value in step S100 is the predicted value of the power demand when the vehicle 30 is not dispatched, the second predicted value in step S103 is the predicted value of the power demand when the vehicle 30 is dispatched. Specifically, the control unit 23 may calculate the second predicted value by subtracting the power demand of the residential facility of each resident specified in step S102 from the first predicted value in step S100 and adding the power needed to move the vehicle 30 along the traveling route determined in step S102. However, the acquisition of the second predicted value is not limited to the above example, and any method can be adopted.

Step S104: The control unit 23 determines whether the second condition that the second predicted value in step S103 is smaller than the first predicted value in step S100 is satisfied. When it is determined that the second condition is satisfied (that is, the second predicted value is smaller than the first predicted value) (YES in step S104), the process proceeds to step S105. In contrast, when it is determined that the second condition is not satisfied (that is, the second predicted value is equal to or higher than the first predicted value) (NO in step S104), the process ends.

Here, the second condition may be a condition that the second predicted value is smaller than the first predicted value and the difference between the first predicted value and the second predicted value is equal to or larger than a threshold value.

Step S105: When it is determined in step S104 that the second condition is satisfied (YES in step S104), the control unit 23 dispatches the vehicle 30 that moves at least some of the residents of the area from the residential facility.

In the present embodiment, the control unit 23 dispatches the vehicle 30 that moves each resident specified in step S102 from the residential facility. Specifically, the control unit 23 dispatches the vehicle 30 by transmitting a signal including the travel route determined in step S102, and the position resident information of the residential facility of each resident specified in step S102. The signal may be transmitted to the vehicle 30 via, for example, the communication unit 21 and the network 40, or may be transmitted to the computer of the business operator that manages the vehicle 30. Based on the signal, the vehicle 30 starts traveling toward the predetermined non-residential facility via the residential facility of each resident. Here, the control unit 23 may transmit information indicating that the vehicle 30 is to be dispatched to the terminal device 10 of each resident specified in step S102 via the communication unit 21 and the network 40. Each resident can recognize that the vehicle 30 is dispatched by confirming the information using the terminal device 10.

As described above, the information processing device 20 according to the present embodiment acquires the first predicted value of the power demand in the area including one or more residential facilities. Then, when a predetermined condition regarding the first predicted value is satisfied, the information processing device 20 dispatches the vehicle 30 that moves at least some of the residents in the area from the residential facility.

According to such a configuration, the vehicle 30 is dispatched when a predetermined condition regarding the first predicted value of the power demand of the target area is satisfied. For example, the vehicle 30 can be dispatched when the power demand in the area is expected to be relatively large, such as when the first predicted value is equal to or higher than a predetermined threshold value. By dispatching the vehicle 30, it is possible to motivate at least some of the residents in the area to go outside. As mentioned above, as a result of the residents going out, the power demand in residential facilities can be reduced. Thus, as a result of reducing the power demand in the residential facility, the technology for reducing the power demand is improved in that the probability that the power demand in the entire area is reduced is improved.

Although the present disclosure has been described above based on the drawings and the embodiment, it should be noted that those skilled in the art may make various modifications and alterations thereto based on the present disclosure. It should be noted, therefore, that these modifications and alterations are within the scope of the present disclosure. For example, the functions included in the configurations, steps, etc. can be rearranged so as not to be logically inconsistent, and a plurality of configurations, steps, etc. can be combined into one or divided.

For example, at least one of the terminal device 10 and the vehicle 30 may perform some or all of the operations performed by the information processing device 20 in the above-described embodiment. Further, the operations executed by the information processing device 20 may be distributed and executed by a plurality of computers capable of communicating with each other.

Further, in the above-described embodiment, an example in which the predetermined condition relating to the first predicted value of the power demand in the area includes both the first condition and the second condition has been described. However, the predetermined condition does not have to include the second condition. In such a case, for example, steps S103 and S104 shown in FIG. 5 may be omitted. Specifically, when at least some of the residents of the area are identified in step S102 and the travel route of the vehicle 30 is determined, the process proceeds to step S105. In step S105, the control unit 23 of the information processing device 20 dispatches the vehicle 30 that moves each resident specified in step S102 from the residential facility.

Figure 5:
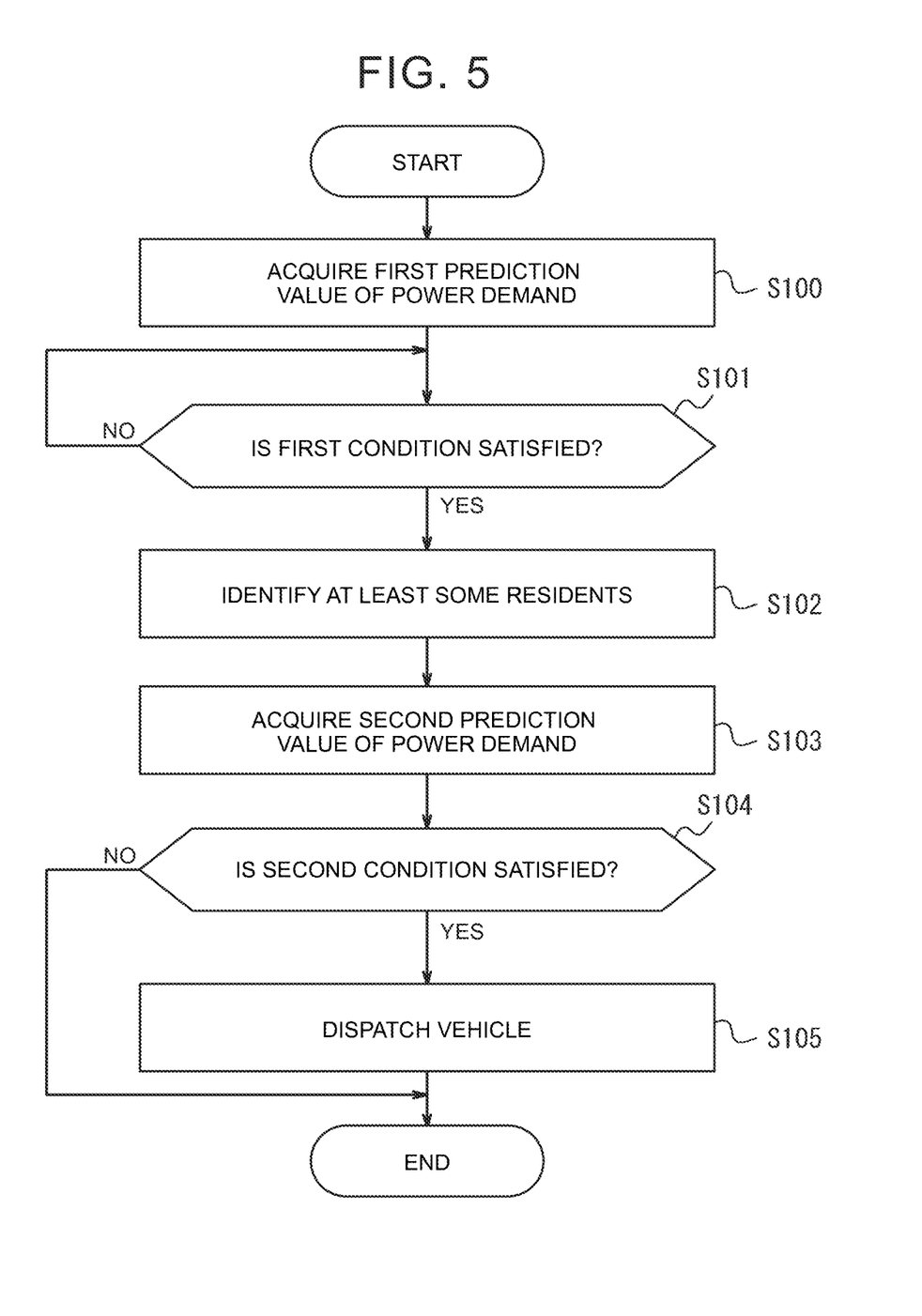
FIG. 5 is a flowchart showing operations of the information processing device.

Further, in the above-described embodiment, described is an example in which the vehicle 30 functions as an on-demand bus that moves to the predetermined non-residential facility by way of the residential facility of each resident specified in step S102 shown in FIG. 5. However, the vehicle 30 may function as a shuttle bus that travels along a predetermined travel route to the predetermined non-residential facility. In such a case, for example, step S102 shown in FIG. 5 may be omitted. Specifically, when it is determined in step S101 that the first condition is satisfied (YES in step S101), the process proceeds to step S103. In step S103, the control unit 23 of the information processing device 20 may calculate the second predicted value by subtracting the power demand of the residential facility of each resident specified in step S102 from the first predicted value in step S100 and adding the power needed to move the vehicle 30 to the predetermined non-residential facility along the predetermined traveling route.

Further, steps S102 to S104 shown in FIG. 5 may be omitted. Specifically, when it is determined in step S101 that the first condition is satisfied (YES in step S101), the process proceeds to step S105. In step S105, the control unit 23 of the information processing device 20 may dispatch the vehicle 30 that functions as the shuttle bus that moves to the predetermined non-residential facility along the predetermined travel route, for example.

Further, in the above-described embodiment, described is an example in which the information processing device 20 identifies at least some of the residents of the area in step S102 shown in FIG. 5. Here, the information processing device 20 may, for example, carry out recruitment to residents in the area and specify each resident who applied for the recruitment. Specifically, the control unit 23 of the information processing device 20 transmits a message, which recruits residents who wish for the vehicle 30 to be dispatched, to the terminal device 10 via the communication unit 21 and the network 40. Here, the transmission destination of the message may be the terminal device 10 of each resident in the area, may be the terminal device 10 of each resident who uses the depleting energy in the residential facility as described above, or may be the terminal device 10 of each resident whose cost of going outside is equal to or higher than the threshold value. When a predetermined operation is performed by the resident who applies for the recruitment, the control unit 15 of the terminal device 10 transmits information indicating that the resident applies to the information processing device 20. Then, the control unit 23 of the information processing device 20 identifies each resident who applied for the recruitment. According to such a configuration, the probability that each resident identified in step S102 goes outside using the vehicle 30 is improved.

Further, in the above-described embodiment, the information processing device 20 may determine the fare of the vehicle 30 to be dispatched based on the first predicted value of the power demand of the area. For example, the control unit 23 of the information processing device 20 may lower the fare of the vehicle 30 as the first predicted value becomes larger. The control unit 23 may set the fare of the vehicle 30 to zero when the first predicted value is equal to or higher than a predetermined reference value. According to such a configuration, when the first predicted value is relatively large, it is possible to give the residents a strong motivation to go outside using the vehicle 30.

Further, an embodiment is also possible in which, for example, a general-purpose computer functions as the information processing device 20 according to the above-described embodiment. Specifically, a program describing processing contents for realizing each function of the information processing device 20 according to the above-described embodiment is stored in the memory of a general-purpose computer, and the program is read out and executed by the processor of the computer. Therefore, the disclosure according to the present embodiment can also be realized as a program that can be executed by a processor or a non-transitory computer-readable medium that stores the program.

What is claimed is:

1. A method executed by an information processing device, the method comprising:
   acquiring a first predicted value of a power demand in an area that includes one or more residential facilities; and
   dispatching a vehicle that moves at least some residents of the area from the residential facilities when a predetermined condition relating to the first predicted value is satisfied.

2. The method according to claim 1, wherein the predetermined condition includes a first condition that the first predicted value is equal to or greater than a threshold value.

3. The method according to claim 1, further comprising acquiring a second predicted value of the power demand for a case in which the vehicle is assumed to be dispatched, wherein the predetermined condition includes a second condition that the second predicted value is smaller than the first predicted value.

4. The method according to claim 1, wherein at least some of the residents include residents who use depleting energy in the residential facilities among the residents of the area.

5. The method according to claim 1, wherein at least some of the residents include residents in which a cost to move from the residential facilities is equal to or greater than a threshold value among the residents of the area.

6. The method according to claim 1, further comprising determining a travel route of the vehicle based on a location of the residential facilities of at least some of the residents.

7. The method according to claim 1, wherein the vehicle is the vehicle that moves at least some of the residents from the residential facilities to a predetermined non-residential facility.

8. An information processing device comprising a control unit, wherein the control unit:
   acquires a first predicted value of a power demand in an area that includes one or more residential facilities; and
   dispatches a vehicle that moves at least some residents of the area from the residential facilities when a predetermined condition relating to the first predicted value is satisfied.

9. The information processing device according to claim 8, wherein the predetermined condition includes a first condition that the first predicted value is equal to or greater than a threshold value.

10. The information processing device according to claim 8, wherein:
    the control unit acquires a second predicted value of the power demand for a case in which the vehicle is assumed to be dispatched; and
    the predetermined condition includes a second condition that the second predicted value is smaller than the first predicted value.

11. The information processing device according to claim 8, wherein at least some of the residents include residents who use depleting energy in the residential facilities among the residents of the area.

12. The information processing device according to claim 8, wherein at least some of the residents include residents in which a cost to move from the residential facilities is equal to or greater than a threshold value among the residents of the area.

13. The information processing device according to claim 8, wherein the control unit determines a travel route of the vehicle based on a location of the residential facilities of at least some of the residents.

14. The information processing device according to claim 8, wherein the vehicle is the vehicle that moves at least some of the residents from the residential facilities to a predetermined non-residential facility.

15. A program causing an information processing device to execute:
    acquiring a first predicted value of a power demand in an area that includes one or more residential facilities; and
    dispatching a vehicle that moves at least some residents of the area from the residential facilities when a predetermined condition relating to the first predicted value is satisfied.

16. The program according to claim 15, wherein the predetermined condition includes a first condition that the first predicted value is equal to or greater than a threshold value.

17. The program according to claim 15, wherein:
the program causes the information processing device to further execute acquiring a second predicted value of the power demand for a case in which the vehicle is assumed to be dispatched; and
the predetermined condition includes a second condition that the second predicted value is smaller than the first predicted value.

18. The program according to claim 15, wherein at least some of the residents include residents who use depleting energy in the residential facilities among the residents of the area.

19. The program according to claim 15, wherein at least some of the residents include residents in which a cost to move from the residential facilities is equal to or greater than a threshold value among the residents of the area.

20. The program according to claim 15, wherein the program causes the information processing device to further execute determining a travel route of the vehicle based on a location of the residential facilities of at least some of the residents.

* * * * *